United States Patent [19]

Nishiki

[11] Patent Number: 4,725,734
[45] Date of Patent: Feb. 16, 1988

[54] RADIATION-DETECTING DEVICE FOR COMPUTED TOMOGRAPHY

[75] Inventor: Masayuki Nishiki, Ootawara, Japan

[73] Assignee: Kabushiki Kaisha Toshiba, Kawasaki, Japan

[21] Appl. No.: 730,041

[22] Filed: May 3, 1985

[30] Foreign Application Priority Data

May 10, 1984 [JP] Japan .................... 59-94799

[51] Int. Cl.$^4$ .............................................. G01T 1/20
[52] U.S. Cl. .................... 250/366; 250/505.1;
378/19; 378/147
[58] Field of Search ............ 250/366, 367, 368, 486.1, 250/487.1, 488.1, 505.1; 378/19, 147

[56] References Cited

U.S. PATENT DOCUMENTS

| | | | |
|---|---|---|---|
| 4,005,292 | 1/1977 | Oesterlin et al. | 250/366 |
| 4,180,737 | 12/1979 | Kingsley | 250/367 |
| 4,181,856 | 1/1980 | Bone | 250/366 |
| 4,338,521 | 7/1982 | Shaw et al. | 250/366 |
| 4,394,576 | 7/1983 | Tanaka et al. | 250/367 |
| 4,533,489 | 8/1985 | Utts et al. | 250/487.1 |

FOREIGN PATENT DOCUMENTS

| | | | |
|---|---|---|---|
| 0112475 | 7/1984 | European Pat. Off. | 250/367 |
| 3205760 | 10/1982 | Fed. Rep. of Germany . | |
| 2030422 | 4/1980 | United Kingdom . | |

Primary Examiner—Janice A. Howell
Assistant Examiner—David P. Porta
Attorney, Agent, or Firm—Finnegan, Henderson, Farabow, Garrett & Dunner

[57] ABSTRACT

A radiation-detecting device for computed tomography, wherein a plurality of scintillation elements are linearly arranged with a collimator plate interposed between the respective units thereof; an outermost collimator plate is set outside of each terminal unit of said linearly arranged scintillation elements; the scintillation elements are adhered to the surface of a semiconductor substrate on which a plurality of photodiode elements are mounted. The scintillation element emits a light upon receipt of X-rays. The light beams emitted from the scintillation elements and collected by the collimtor plates are detected by the photodiode elements. The outermost collimator plate is made thicker than the collimator plate interposed between the adjacent scintillation elements. Namely, the outermost collimator plate has a thickness of, for example, 0.2 mm, though the collimator plate interposed between the adjacent scintillation elements has a thickness of 0.1 mm. The respective detectors comprising a plurality of scintillation elements and collimator plates are set apart from each other at a clearance of, for example, 0.13 mm, thereby ensuring a substantial accord between the X-ray detecting property of the outermost scintillation elements and other intervening scintillation elements.

9 Claims, 10 Drawing Figures

F I G. 10
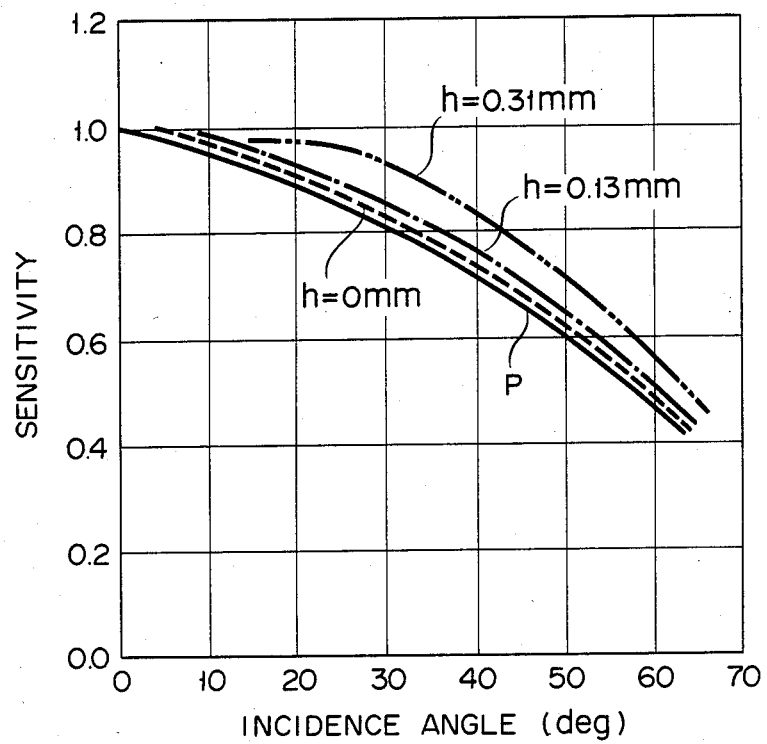

RADIATION-DETECTING DEVICE FOR COMPUTED TOMOGRAPHY

BACKGROUND OF THE INVENTION

This invention relates to a radiation-detecting device applied to computed radiation tomography (hereinafter abbreviated as CT).

An X-ray CT device of the third or fourth generation comprises a plurality of X-ray detectors arranged along the periphery. The detector involves a plurality of detection elements densely arranged in a direction. To obtain a CT image having a high resolving power, the detection elements have to be arranged with as short a pitch as possible. To meet this requirement, a solid scintillation detector constructed by combining a scintillator and photodiode is applied in place of the conventional gas ionization box.

With the conventional solid scintillation detector, a plurality of photodiode elements are mounted on a semiconductor substrate. A scintillation element is attached to the surface of each of the photodiode elements by means of a transparent adhesive. A collimator plate is set between the respective scintillation elements and also on the outside of the scintillation elements fixed at both ends of said scintillation element group. Thus, each scintillation element is sandwiched between two adjacent collimator plates. The conventional solid scintillation detectors constructed as described above are arranged at a small distance from each other along the periphery of the subject radiation-detecting device.

X-rays are brought into the conventional radiation detector at various angles, and the X-rays carried into the respective scintillation elements are detected with the sensitivity which varies with their incidence angles. The conventional radiation detector has the drawback that the manner in which the sensitivity of detecting the X-rays brought into the scintillators set at both ends of their group varies with the incidence angles of said X-rays is different from that in which the sensitivity of detecting the X-rays carried into the other scintillators varies with the incidence angles of said other X-rays. This undesirable event is assumed to arise from the undermentioned fact. Namely, the scintillation elements set at both ends of their group receive X-rays brought not only directly but also through the adjacent scintillation elements and free space (air region). In contrast, the other scintillation elements only receive directly introduced X-rays and those carried through the adjacent scintillation elements. Therefore, the two outermost scintillation elements receive a larger amount of X-rays than the other scintillation elements. Therefore, the scintillation elements provided at both ends of their group detect X-rays with a higher sensitivity than the other scintillation elements.

If, therefore, the X-ray detecting sensitivity differs as described above between the scintillation elements provided at both ends of their group and the other scintillation elements, then difficulties will be encountered in compensating the collected data, thus resulting in a failure to carry out an accurate diagnosis. The aforementioned difference in the X-ray detecting sensitivity between both groups of scintillation elements is also governed by the magnitude of a clearance allowed between the respective scintillation elements. If, therefore, an X-ray detector is set at a place different from that which was originally prescribed, then the X-ray detecting sensitivity will undesirably decrease.

SUMMARY OF THE INVENTION

It is accordingly the object of this invention to provide a radiation-detecting device for computed tomography which is saved from variations in the X-ray detecting sensitivity which might be caused by different clearances between the respective adjacent scintillation elements, and is also capable of unifying the X-ray detecting capacity regardless of the position of the X-ray detecting elements.

To attain the above-mentioned object, this invention provides a radiation-detecting device for computed tomography, which comprises:

a plurality of detectors arranged in a circular form, said detector involving a plurality of scintillation elements which emit light beams upon receipt of radiation; a plurality of collimator plates interposed between the adjacent scintillation elements, each of the collimator plates collecting light beams emitted from the scintillation element; and outer collimator plates set outside of the scintillation elements constituting the terminal units of the series thereof, each of the outermost collimator plates collecting light beams issued from the scintillation element constituting the terminal unit, and being made thicker than the collimator plates interposed between the adjacent scintillation elements; and wherein a clearance is allowed between the mutually facing outermost collimator plates of the adjacent detectors.

With the radiation-detecting device for computed tomography embodying this invention, radiation conducted through the clearances (air regions) between the adjacent detectors passes through a thick collimator plate into a scintillation element set at one end of the group thereof. Therefore, radiation carried through an air region having a small radiation-absorbing capacity is absorbed in said thick collimator plate more than in the interior collimator plates. Eventually, therefore, radiation entering the scintillation element provided at one end of the group thereof is absorbed substantially to the same degree as the radiation conducted through the interior scintillation elements. Thus the inner scintillation elements and the scintillation element at one end of the group thereof can absorb radiation at the same rate, thereby enabling radiation to be detected equally by both inner and outer scintillation elements, and offering great advantage in the arithmetic operation of detected data.

This invention offers further advantages in that the radiation-detecting property only varies to a small extent even when the inter-detector clearance changes, thus minimizing variations in the radiation-detecting properties of the respective detectors, and consequently greatly promoting accurate diagnosis.

BRIEF DESCRIPTION OF THE DRAWINGS

FIGS. 8 to 10 set forth X-ray detecting properties when the scintillation element is formed of ZnWO$_4$, and the collimator plate is made of Pb, when the respective outermost collimator plates of these figures have thicknesses of 0.3, 0.2 and 0.1 mm.

DETAILED DESCRIPTION OF THE PREFERRED EMBODIMENTS

Figure 1:
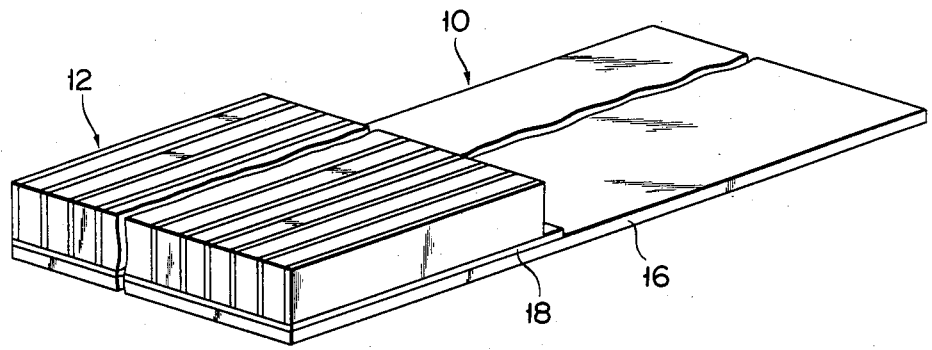
FIG. 1 is an oblique view of a detector involved in a radiation-detecting device embodying this invention for computed tomography.
Figure 2:
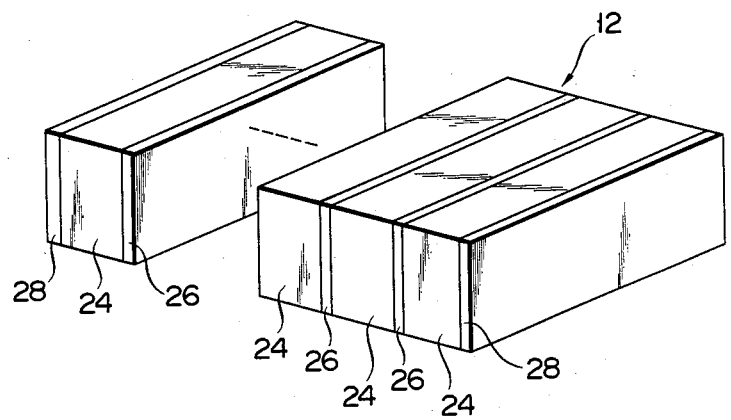
FIG. 2 is also an oblique view of a group of scintillation elements involved in said radiation-detecting device.
Figure 3:
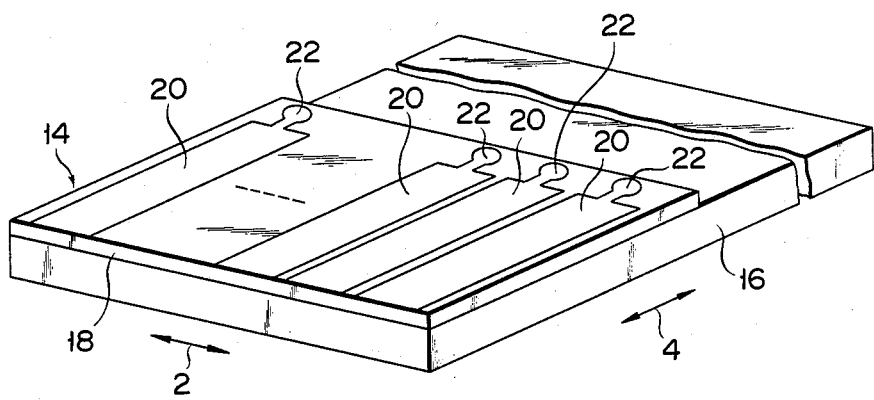
FIG. 3 is also an oblique view of a group of photodiode elements.

FIG. 1 is an oblique view of a detector 10 involved in a radiation-detecting device embodying this invention; and FIGS. 2 and 3 are also the oblique views of the component members of said detector 10. A semiconductor substrate 18 is adhered to the surface of an insulating substrate 16 having a width of 24 to 25 mm. A group 14 of photodiode elements are arranged on said semiconductor substrate 18. A group 12 of scintillation elements are attached to the surface of the group 14 of the photodiodes by means of, for example, transparent adhesive (for example, glassy adhesive). The group 14 of photodiodes consists of a plurality of photodiode elements 20 extending in the direction of an arrow 4 and aligned in parallel in the direction of an arrow 2. Each photodiode element 20 is fitted with a signal-issuing terminal 22. This terminal 22 is electrically connected to a printing wire terminal (not shown) set on the insulating substrate 16 by means of wire bonding (not shown).

The scintillator group 12 comprises the same number of scintillation elements 24 as the photodiode elements 20, a plurality of collimator plates 26 interposed between the respective adjacent scintillation elements and, further two other collimator plates 28 respectively set on the outside of both terminal units of the series of said scintillation elements 24. Each scintillation element extending in the direction of the arrow 4 has a length of, for example, 30 mm, a thickness of, for example, 0.9 mm and a height of, for example, 2 mm. The collimator plate 26 is interposed between every two scintillation elements 24. The aforesaid collimator plate 28 is set on the outside of the scintillation elements 24 constituting both terminal units of the series of said scintillation elements 24. The collimator plate 26, 28 and scintillation element 24 are securely set in place by means of adhesive. The scintillation elements 24 are prepared from, for example, CdWO$_4$ or ZnWO$_4$, and emits a light upon receipt of X-rays. The collimator plates 26, 28 are generally prepared from a heavy metal such as Pb or W having a high X-ray absorbing rate. The collimator plates are coated on both sides with a highly efficient reflector to reflect light beams generated from the scintillation element 24.

The collimator plate 26 interposed between every adjacent scintillation element 24 has a thickness of, for example, 0.1 mm. An adhesive layer and reflection layer respectively having a thickness of about 0.025 mm are filled between the collimator plate 26 and scintillation element 24. The collimator plates 28 set outside of the scintillation elements 24 constituting both terminal units of the series thereof are made with a greater thickness than the collimator plate 26, for example, greater than 0.1 mm or preferably less than 0.3 mm.

The group 12 of scintillation elements and the group 14 of photodiodes are securely set in place by means of adhesive in such a manner that said groups 12 and 14 are aligned, and the collimator plate 26 prevents a light issued from the scintillation element 24 from entering the adjacent photodiode element 20. The group 12 of the scintillation elements 24 jointly constituting the detector 10 arranged as described above is coated with a cover prepared from, for example, aluminum and resin, thereby preventing an external light from entering the scintillation elements 24.

Figure 4:
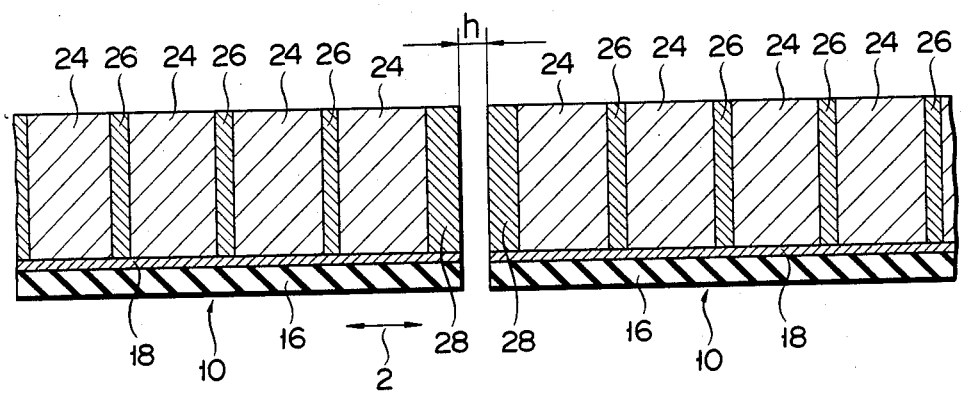
FIG. 4 illustrates a clearance between the respective detectors.

A plurality of detectors 10 constructed as described above are arranged in the circular form having a diameter of, for example, 70 cm with a clearance h allowed, as shown in FIG. 4, between the facing collimator plates 28 set outside of the scintillation elements 24 constituting the terminal units of the adjacent groups 12 of scintillation elements. In this case, that side of the detector 10 on which the series of said scintillation elements 24 are arranged is made to face the center of said circle. The respective detectors 10 comprises 24-channel scintillation elements. Therefore, all the detectors consist of scintillation elements having about 2,000 channels.

This invention is characterized in that, as previously mentioned, the collimator plate 28 set outside of the terminal unit of a group of the scintillation elements is made thicker than the collimator plate 26 interposed between the adjacent scintillation elements 24. A description will now be made of the reason for the abovementioned prescribed arrangement as well as of the operation of the subject radiation-detecting device. X-rays permeating a foreground subject (for example, a patient) enter the scintillation elements 24 jointly constituting the detector 10. The scintillation element 24 emits a light to an extent corresponding to the amount of X-rays received. The amount of the received light is converted by the photodiode elements 20 into an electric signal having a magnitude corresponding to the amount of the received light. Detection signals issued from the photodiode elements 20 are introduced into a computer, thereby providing the tomographic image of the patient.

Figure 5:
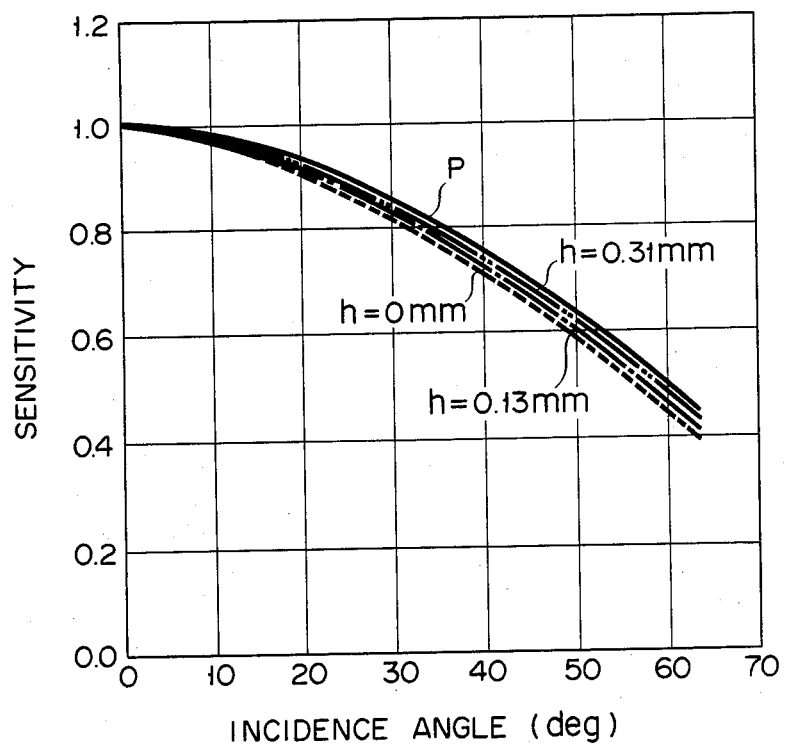
FIGS. 5 to 7 show X-ray detecting properties when the scintillation element is prepared from CdWO$_4$ and the collimator plate is prepared from Pb, when the respective outermost collimator plates of these figures have thicknesses of 0.3, 0.2 and 0.1 mm.
Figure 6:
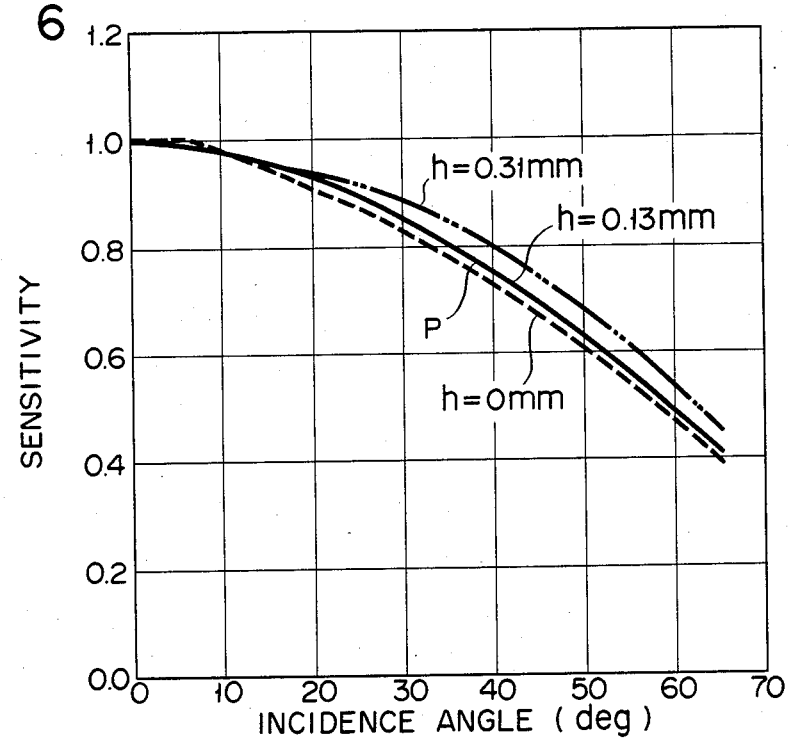
Figure 7:
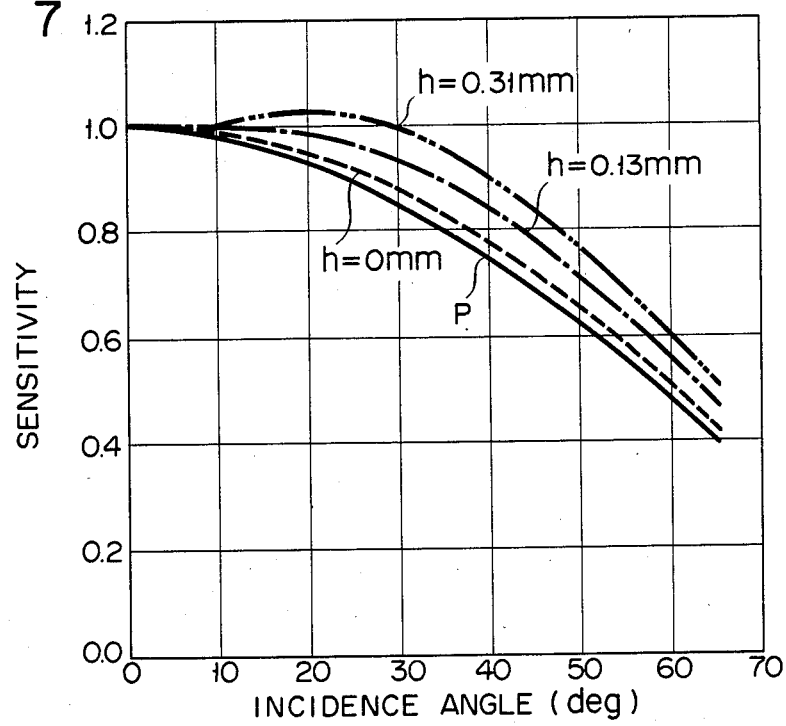

In the above-mentioned case, the sensitivity with which X-rays issued from the scintillation element are detected varies with the angle at which the X-rays enter the detector 10, and also with the magnitude of the clearance h between the mutually facing collimator plates 28. FIGS. 5, 6 and 7 illustrate the X-ray detecting properties (variations in the X-ray detecting sensitivity corresponding to those in the incidence angle of the X-rays). The X-ray detecting property was defined by geometrically determining the routes through which X-rays enter the detector 10 at various incidence angles and arithmetically computing the length of that portion of the collimator plate through which the X-rays are conducted. Throughout FIGS. 5, 6 and 7, P (a solid line) denotes an X-ray detecting property determined at the scintillation elements 24 other than those constituting both terminal units of the series of said scintillation elements 24. A broken line, one dot-dash line and two dots-dash line illustrate an X-ray detecting property determined at the scintillation elements 24 constituting the terminal units of the series thereof. The curves respectively denote the X-ray detecting property determined when the above-defined clearance h measures 0 mm, 0.13 mm and 0.31 mm. FIG. 7 represents the case where the outermost collimator plate 28 and the collimator plate 26 interposed between the two adjacent scintillation elements 24 have the same thickness of 0.1 mm (as in the conventional radiation-detecting device). FIG. 6 denotes the case where the interposed collimator plate 26 has a thickness of 0.1 mm and the outermost collimator plate 28 has a thickness of 0.2 mm. FIG. 5 shows the case where the interposed collimator plate 26 has a thickness of 0.1 mm, and the outermost collimator plate 28 has a thickness of 0.3 mm. When the outermost collimator plate and interposed collimator plate have the same thickness as in the conventional radiation-detecting device represented by FIG. 7, a variance arises between the X-ray detecting property of the scintillation element constituting the terminal unit of the group thereof and that of the other scintillation elements. Moreover, said variance becomes more noticeable as a greater difference appears between the above-defined clearance h. In contrast, if the outermost collimator plate 28 has a thickness twice as great as that of the collimator interposed between the adjacent scintillation elements 24 and the clearance h is substantially zero, then the outermost scintillation elements 24 have a lower X-ray detecting sensitivity than the other scintillation elements. As the clearance h becomes wider, the X-ray detecting sensitivity of said outermost scintillation elements rises higher. When the clearance h measures 0.13 mm, X-ray detecting sensitivity of the outermost scintillation elements accords with that of the other scintillation elements. When, therefore, the outermost collimator plate 28 is defined to have a thickness of 0.2 mm and the clearance h is set at 0.13 mm, then all the scintillation elements 24 have an equal X-ray detecting sensitivity. Referring to FIG. 5 again, X-ray detecting sensitivity of the scintillation elements 24 varies with the clearance h to a lesser extent than in FIG. 7.

When the outermost collimator plate 28 is defined to have a thickness of 0.3 mm (FIG. 5), the X-ray detecting sensitivity of the scintillation elements 24 varies with the clearance h to a lesser extent. If, in this case, the clearance h is slightly larger than 0.31 mm, the outermost scintillation elements 24 and other similar units have the same X-ray detecting sensitivity.

Figure 8:
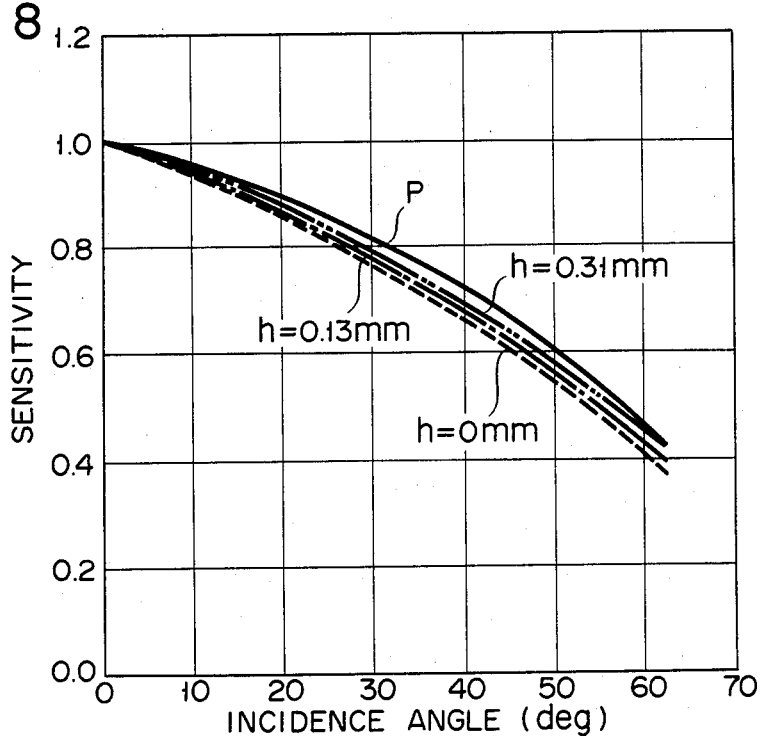
Figure 9:
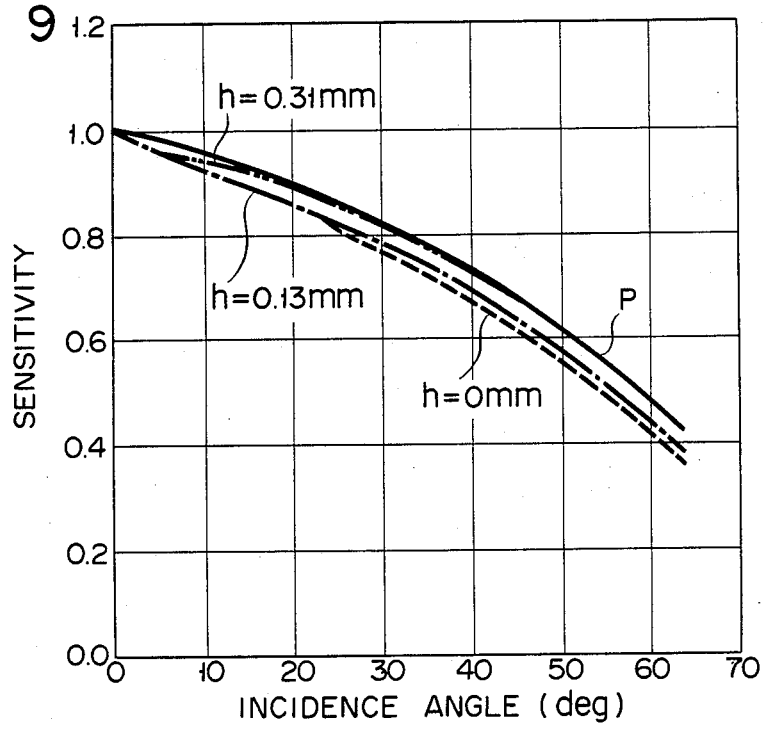

The above-mentioned relationship between the clearance h and the X-ray detecting sensitivity of the scintillation elements 24 remains unchanged even when the scintillation element 24 is prepared from $ZnWO_4$ in place of $CdWO_4$. FIGS. 8 to 10 illustrate the X-ray detecting sensitivity of the scintillation elements prepared from $ZnWO_4$ when the collimator plates are made of Pb. When the outermost collimator plate 28 is thicker than the collimator plates 26 interposed between the adjacent scintillation elements 24 (FIGS. 8 and 9), the X-ray detecting sensitivity of the scintillation elements 24 varies with the clearance h to a less noticeable extent than otherwise. If the outermost collimator plates 28 and those 26 interposed between the adjacent scintillation elements 24 have the same thickness, and in this case it is attempted to reduce the clearance h substantially to zero (such an attempt has difficulties from the standpoint of design and manufacture), then a difference appears between the X-ray detecting sensitivity of both outermost scintillation elements and other intervening scintillation elements. If the clearance h is made wider, the outermost scintillation elements will have an X-ray detecting sensitivity much different from that of the other scintillation elements. If, otherwise, the outermost collimator plates 28 have a thickness twice greater (FIG. 9) than the collimator plates 26 interposed between the adjacent scintillation elements 24 and the clearance h is set at zero, then the outermost scintillation elements 24 will have a lower X-ray detecting sensitivity than the other scintillation elements 24. If the clearance h is set at 0.31 mm, then the outermost and intervening scintillation elements 24 will have the same X-ray detecting sensitivity. Further, if the outermost collimator plates 28 have a thickness three times greater than the collimator plates 26 interposed between the adjacent scintillation elements 24, and in this case the clearance h is wider than 0.31 mm, then the outermost scintillation elements 24 and other scintillation elements 24 will have the same X-ray detecting sensitivity.

As mentioned above, if both outermost collimator plates 28 of the respective detectors 10 are made thicker than the intervening collimator plates 26, and the clearance h is chosen to have a proper width, then an accord will be ensured between the X-ray detecting sensitivity of the outermost scintillation elements 24 and the other intervening scintillation elements 24. Further, if the outermost collimator plates 28 are made thicker than the collimator plates 26 interposed between the adjacent scintillation elements 24, then the X-ray detecting sensitivity of the scintillation elements 24 will vary with the clearance h to a lesser extent than otherwise. For the reason given above, the captioned radiation-detecting device for computed tomography is characterized in that the outermost collimator plates 28 are made thicker than the collimator plates 26 interposed between the respective adjacent scintillation elements 24. If the outermost collimator plates are made thicker, then the X-ray detecting sensitivity of the scintillation elements 24 will vary with the width of the clearance h to a lesser extent. If, however, the outermost collimator plate 28 is made thicker, then a greater distance will inevitably be allowed between the scintillation elements 24 constituting the outermost units of the groups thereof one detector 10 and those outermost scintillation elements 24 of the adjacent detector 10. Further, if the outermost collimator plate is made thick, it will be necessary to widen the clearance h in order to ensure coincidence between the X-ray detecting sensitivity of the outermost scintillation elements 24 and that of the other intervening scintillation elements 24. In such case, the practical difficulties will arise that the adjacent detectors 10 will have to be set apart from each other at a greater distance in detecting X-rays. For the reason given above, it is preferred that the thickness of the outermost collimator plate 28 be made 1.5 to 2 times greater than that of the collimator plates 26 interposed between the respective adjacent scintillation elements 24.

With the aforementioned embodiment of this invention, it is attempted to cause X-rays entering the outermost scintillation elements to be more efficiently absorbed by increasing the thickness of the outermost collimator plates 28. If, however, the outermost collimator plates 28 and the collimator plates 26 interposed between the adjacent scintillation elements 24 are prepared from different materials, it is possible to cause X-rays to be absorbed at a different rate from the case where said collimator plates 26, 28 are prepared from the same material. Among the heavy metals, W more efficiently absorbs X-rays than Mo and Pb. If, therefore, the outermost collimator plates 28 are prepared from W and the collimator plates 26 interposed between the adjacent scintillation elements 24 is made of Pb, then the outermost scintillation elements can be reduced in the X-ray detecting sensitivity.

What is claimed is:

1. A radiation-detecting device for computed tomography, comprising a plurality of detector blocks arranged end to end in a circular form with preselected clearances therebetween, each of said detector blocks including:
- a plurality of spaced-apart scintillation elements for converting incident X-ray radiation into a fluorescence emission, two of said scintillation elements being terminal elements and having a side facing one of said clearances;
- a plurality of first collimator plates interposed between adjacent ones of said scintillation elements for preventing fluorescence emission from crossing between said adjaent scintillation elements and for restraining radiation incident on one of said scintillation elements from crossing the spaces between adjacent scintillation elements; and
- a pair of second collimator plates each disposed on one of said sides of said terminal scintillation elements facing said clearances for restraining radiation from crossing from said clearances to said terminal scintillation elements, said second collimator plates being thicker than said first collimator plates.

2. The radiation-detecting device according to claim 1, wherein said second collimator plates are 1.5 to 2 times thicker than said first collimator plates.

3. The radiation-detecting device according to claim 2, wherein said first collimator plates have a thickness of 0.1 mm, and said second collimator plates have a thickness of 0.15 to 0.2 mm.

4. The radiation-detecting device according to claim 3, wherein said first and second collimator plates are formed of Pb; said scintillation elements are formed of $CdWO_4$; said second collimator plates have a thickness of 0.15 mm; and said clearance is set at 0.13 mm.

5. The radiation-detecting device according to claim 1, wherein said first and second collimator plates are formed of $ZnWO_4$; said second collimator plates have a thickness of 0.2 mm; and said clearance is set at 0.31 mm.

6. The radiation-detecting device according to claim 1, wherein said second collimator plates are formed of a material having a higher X-ray radiation-absorbing rate than said first collimator plates.

7. The radiation-detecting device according to claim 1, wherein each of said detector blocks further includes a plurality of photodiodes for converting the fluorescence emission of said scintillation elements into electrical signals.

8. The radiation-detecting device according to claim 1, wherein each of said first and second collimator plates includes a reflective coating for reflecting fluorescence emissions from adjacent ones of said scintillation elements.

9. A device for detecting radiation such as X-rays, comprising a plurality of detector blocks arranged end to end in a circular form with preselected clearances therebetween, each of said detector blocks including:
- a flat insulating plate;
- a plurality of discrete photodiode elements disposed on said flat insulating plate, said photodiode elements converting fluorescence emission into electrical signals;
- a plurality of spaced-apart scintillation elements for converting incident X-ray radiation into a fluorescence emission, each of said scintillation elements being disposed on one of said photodiode elements and each of said photodiode elements converting the fluorescence emission of said respective one of said scintillation elements into an electrical signal, two of said scintillation elements being terminal elements and having a side facing one of said clearances;
- a plurality of first collimator plates interposed between adjacent ones of said scintillation elements for preventing fluorescence emission from crossing between said adjacent scintillation elements and for restraining radiation incident on one of said scintillation elements from crossing the spaces between adjacent scintillation elements; and
- a pair of second collimator plates each disposed on one of said sides of said terminal scintillation elements facing said clearances for restraining radiation from crossing from said clearances to said terminal scintillation elements, said second collimator plates being thicker than said first collimator plates.

* * * * *